United States Patent

Striegel et al.

[11] Patent Number: 5,865,514
[45] Date of Patent: Feb. 2, 1999

[54] CIRCUIT ARRANGEMENT FOR A BRAKING SYSTEM WITH ANTI-LOCK CONTROL SYSTEM

[75] Inventors: Thomas Striegel, Liederbach; Ronald Lehmer, Steinbach; Norbert Ehmer, Eschborn; Jurgen Woywod, Morfelden, all of Germany

[73] Assignee: ITT Manufacturing Enterprises Inc., Wilmington, Del.

[21] Appl. No.: 836,932
[22] PCT Filed: Sep. 22, 1995
[86] PCT No.: PCT/EP95/03738
§ 371 Date: Aug. 13, 1997
§ 102(e) Date: Aug. 13, 1997
[87] PCT Pub. No.: WO96/15924
PCT Pub. Date: May 30, 1996

[30] Foreign Application Priority Data

Nov. 23, 1994 [DE] Germany ............. 44 41 624.5

[51] Int. Cl.⁶ .................... B60T 8/32; B60T 8/60; B60T 8/84; B60T 8/00
[52] U.S. Cl. ........................... 303/149; 303/148
[58] Field of Search ..................... 303/149, 121, 303/148, 146, 176, 156, 140, 141, 147; 180/197; 701/73, 71, 78, 80, 90

[56] References Cited

U.S. PATENT DOCUMENTS

| | | |
|---|---|---|
| 4,489,382 | 12/1984 | Jonner et al. ............. 303/148 |
| 5,315,518 | 5/1994 | Lin . | |

FOREIGN PATENT DOCUMENTS

| | | |
|---|---|---|
| 435114 | 7/1991 | European Pat. Off. . |
| 2442165 | 6/1980 | France . |
| 3816631 | 12/1988 | Germany . |
| 3925828 | 2/1991 | Germany . |
| 4012168 | 10/1991 | Germany . |
| 4114734 | 11/1992 | Germany . |
| 9615924 | 5/1996 | WIPO . |

OTHER PUBLICATIONS

German Report of the German Patent Office relating to Parent German Patent Application No. 44 41 624.5.

English trnaslation of the International Preliminary Examination Report of Application No. PCT/EP95/03738 filed Sep. 22, 1995.

Primary Examiner—Douglas C. Butler
Attorney, Agent, or Firm—J. Gordon Lewis; Thomas N. Twomey

[57] ABSTRACT

A circuit arrangement which is provided for a vehicle with an electronic anti-lock control system and is used to enhance the driving stability in critical driving situations includes circuits for the individual control of the braking pressure on the front wheels and for limiting the yawing torque following braking maneuvers on $\mu$-split road surfaces. In defined, especially critical driving situations, in particular during driving maneuvers with an abrupt change in $\mu$-conditions or during braking maneuvers on $\mu$-patch road surfaces, when predetermined criteria for a critical driving situation of this type are satisfied, a special control is started to bring about braking pressure reduction on the HM-wheel for a predetermined period which is responsive to vehicle speed.

11 Claims, 4 Drawing Sheets

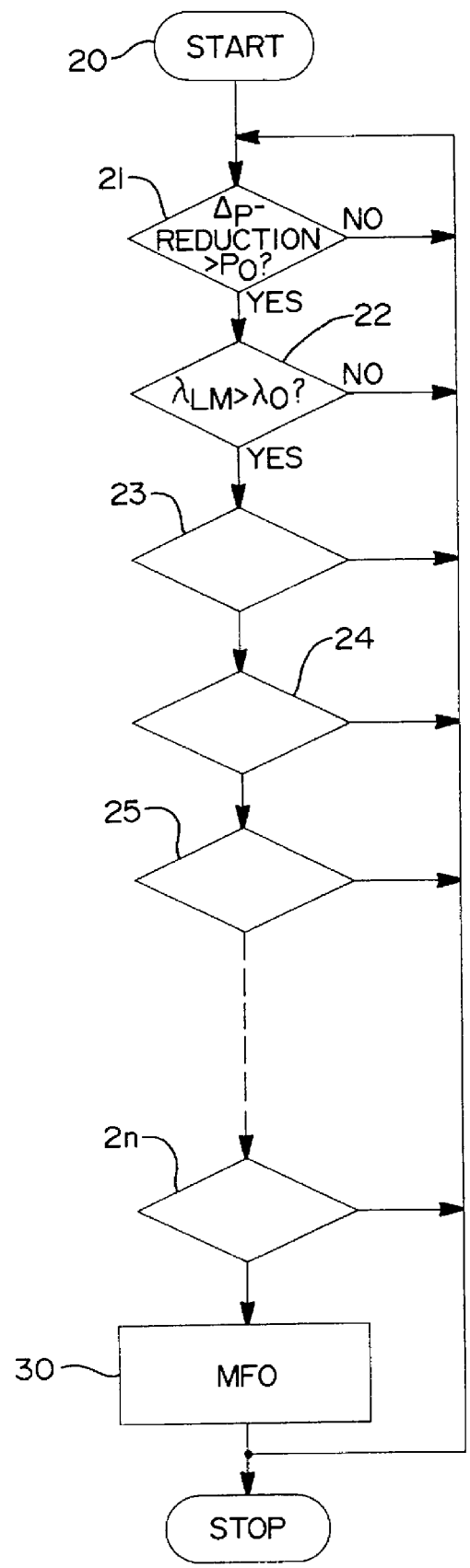

CIRCUIT ARRANGEMENT FOR A BRAKING SYSTEM WITH ANTI-LOCK CONTROL SYSTEM

FIELD OF THE INVENTION

The present invention relates to a circuit arrangement which is provided for an automotive vehicle brake system with electronic anti-lock control to enhance the driving stability in critical driving situations and includes circuits for the individual control of the braking pressure in the wheel brakes of the front wheels in response to the rotational behavior of the wheels and for the limitation of yawing torques which occur due to braking maneuvers on road surfaces having a different friction coefficient on the right/left sides. The circuit may include a hard wired circuit, a programmed circuit, or mixed forms thereof.

BACKGROUND OF THE INVENTION

German patent application No. 39 25 828 discloses a circuit arrangement of this type. An anti-lock control system with individual control of the braking pressure on both wheels of an axle is described. The braking pressure difference on the two wheels of an axle is restricted to limit the yawing torque on split road surfaces, and the allowable braking pressure difference is determined as a function of the difference in friction coefficients and the magnitude of the lower coefficient of friction. In the event of exceeding of the allowable braking pressure difference, in consideration of the motional condition of the LM-wheel, that is the wheel on the lower coefficient side, the braking pressure on the HM-wheel, i.e. the other wheel of the same axle, is reduced. To determine the allowable pressure difference in this known anti-lock control system, the pressure introduced by the driver is measured on the right and the left wheel, and the nominal pressure is compared to the actual pressure in each case. The coefficient of friction is assessed on the basis of the braking pressure.

Further, German patent application No. 41 14 734 discloses a circuit arrangement for anti-lock control with an individual braking pressure control and yawing torque limitation which is based on the fact that a value, representative of the pressure difference on the two wheels of an axle, is constantly determined from the pressure reduction signals and, under $\mu$-split conditions, the medium pressure increase gradient on the HM-wheel is varied as a function of the pressure difference and the vehicle deceleration and that the braking pressure on the HM-wheel is reduced by a value, which is responsive to the vehicle deceleration and the pressure difference, at the time of the occurrence of the so-called yawing torque peak.

The above mentioned, known provisions do not permit preventing the generation of yawing torques of a dangerous amount in defined, especially critical situations. For example, different wheel lock pressure levels in the individual wheel brakes occur on road surfaces having varying coefficients of friction, so-called $\mu$-patch road surfaces, due to a changing dynamic axle load distribution and the related variation of the wheel vertical forces. When these variations occur on the right and the left road surface side, they cause yawing torques which may jeopardize the driving stability. Especially in vehicles having a short wheelbase and front-wheel drive, the rear axle alone cannot ensure that driving stability is maintained.

In principle, the previous solutions involve slowing down the occurrence of yawing torques during braking on $\mu$-split road surfaces by a decelerated braking pressure rise on the front HM wheel to give the driver time for a reaction, i.e., for countersteering. However, when the coefficient of friction changes, in particular from a high value to a low value, the described effects will be encountered.

OBJECT OF THE INVENTION

An object of the present invention is to prevent the occurrence of dangerous yawing torques even in defined, especially critical driving situations, above all when passing from a high, homogeneous coefficient of friction to a $\mu$-split road surface or during braking maneuvers on $\mu$-patch road surfaces, and to virtually enhance the driving stability also in such driving situations.

SUMMARY OF THE INVENTION

It has been found that this object can be achieved by a circuit arrangement which in defined, critical driving situations, in particular when passing into a $\mu$-split road surface or during braking maneuvers on $\mu$-patch road surfaces, and upon identifying predetermined criteria for such a critical driving situation, initiates a special control which causes braking pressure reduction in the wheel brake of the front wheel having the higher coefficient of friction, the so-called "HM-wheel", for a predetermined period of time which is responsive to the vehicle speed or vehicle reference speed.

Thus, the present invention initially determines whether there is a defined, especially critical driving situation, and switch over is made to a special control which is appropriate for this situation only and is used for a one-time reduction (such a reduction may also be effected several times on $\mu$-patch road surfaces) of the braking pressure on the HM-wheel in favor of driving stability. In some cases and with some vehicle types, it is helpful to additionally reduce the braking pressure on the rear wheels.

In a favorable embodiment of the present invention, a driving situation is assessed as critical or identified as critical if one or a plurality of the following criteria simultaneously are satisfied:

- The braking pressure difference or the difference in braking pressure reduction times on the front wheels exceeds a predetermined braking pressure difference limit value.
- The vehicle speed or vehicle reference speed ranges above a predetermined speed limit value.
- The slip of the low coefficient side front wheel, the so-called "LM-wheel", ranges above a slip limit value which is responsive to the vehicle (reference) speed.
- The duration of the instability of the LM-wheel exceeds a predetermined time.
- The HM-wheel is in the control mode, or the vehicle deceleration is above a predetermined deceleration limit value, and special control has not yet taken place during the instantaneous control action.

The commencement of the special control is only permitted if a defined critical situation is undoubtedly identified. It is favorable in some cases to assess the driving situation as critical only if all listed criteria are satisfied.

In another favorable aspect of the present invention, the circuit arrangement is so designed that the special control during a braking maneuver is repeated when a critical driving situation is identified once more or the critical driving situation continues if, priorly, the braking pressure difference or the difference in braking pressure reduction times has exceeded the predetermined limit value with reversed signs or if there occurred a change in the coefficient of friction conditions right/left. This embodiment relates to the so-called $\mu$-patch road surfaces.

The present invention further discloses that the special control is not initiated, or is prevented, when re-acceleration of the LM-wheel is identified during a braking maneuver as being above a predetermined first acceleration limit value. The re-acceleration limit value is suitably set to a value between 5 and 10 g. Such a high amount of re-acceleration is an indication of a high coefficient of friction. Hence, the wheel concerned is not the LM-wheel.

Appropriately, the special control is interrupted at once when one or a plurality of predetermined criteria for the identification of a critical driving situation is not satisfied any more. The special control will be terminated when re-acceleration of the LM-wheel in excess of roughly 10 to 30 g occurs during the special control interval.

In another aspect of the present invention, the duration of braking pressure reduction due to the special control at a vehicle speed ranging between 30 and 50 km/h is limited to a value between 20 and 40 msec, and this duration is increased in steps or continuously to values up to roughly 50 to 70 msec at higher speeds.

Further, it has proved suitable to set the slip limit value to a value ranging between 60 and 70% at a vehicle speed of about 40 km/h and to reduce this value at higher speeds linearly or in steps until a limit value of about 40%.

The circuit arrangement of the present invention, according to latest findings, is favorably realized by an electronic controller which comprises programmed circuits such as microprocessors, microcontrollers, etc. The controller is part of an anti-lock control system which includes a hydraulic brake system with electrically operable hydraulic valves and sensors to determine the rotational behavior of the vehicle wheels. The programmed circuits are used to evaluate the sensor signals and to generate braking pressure control signals. The circuits are programmed so that the braking pressure in the wheel brakes of the front wheels is controlled individually as a function of the rotational behavior of the wheels and, in doing so, yawing torques caused by driving maneuvers on $\mu$-split road surfaces are limited. A corresponding programming will achieve that the special control is started by way of the above described criteria when the so-called critical driving situations are identified. The special control causes braking pressure reduction on the HM-wheel and, if necessary, also on the rear wheels for a predetermined duration which depends on the vehicle speed. All other above mentioned preferred aspects of the present invention may also be realized by the programmed circuits.

Further details of the present invention can be seen in the following description of embodiments, making reference to the accompanying drawings and diagrams.

BRIEF DESCRIPTION OF THE DRAWINGS

In the drawings,

FIG. 6 is a flow chart to illustrate the operation of the circuit arrangement of FIG. 1.

DETAILED DESCRIPTION OF THE DRAWINGS

Figure 1:
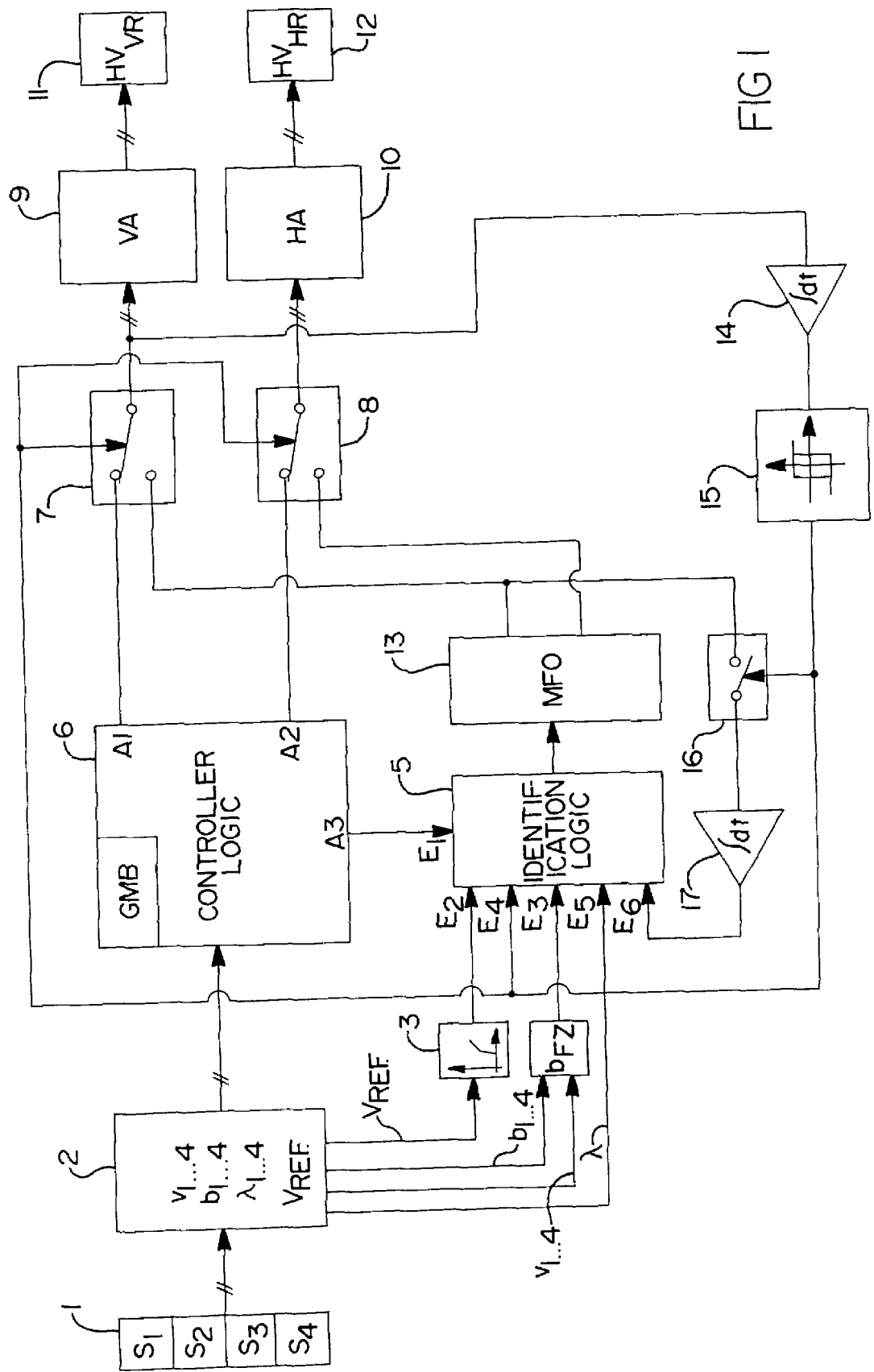
FIG. 1 is a schematically simplified view of the most important components or function blocks of a circuit arrangement of the present invention.

FIG. 1 illustrates the basic design and effect of a circuit arrangement of the present invention. The schematically simplified block diagram shows the electronic part of an antilock control system of the present invention. Block 1 represents wheel sensors $S_1$ to $S_4$ by which the rotational behavior of the individual vehicle wheels is determined in a known fashion. The output signals of the sensors $S_1$ to $S_4$ represent the speeds of the individual wheels. The signals are conditioned and wheel speed signals $v_1$ to $v_4$ are produced in a circuit block 2. Further, the vehicle reference speed $v_{Ref}$, wheel acceleration signals $b_1$ to $b_{41}$ slip values $\lambda_1$ to $\lambda_4$ and, if necessary, still other quantities are determined or calculated in the circuit block 2.

A signal $E_2$ responsive to the instantaneous vehicle (reference) speed $v_{Ref}$ is derived in a circuit 3.

In the present embodiment of the invention, a vehicle deceleration signal $b_{FZ}$ is produced in another circuit 4 by logically combining the deceleration signals $b_1$ to $b_4$ of the individual vehicle wheels in consideration of the wheel speeds $v_1$ to $v_4$. The output signal $E_3$ of circuit 4, exactly as $E_2$ and the signals $E_1, E_4, E_5, E_6$ explained hereinbelow, is conducted to an identification logic 5. The input signal $E_5$ informs the identification logic 5 about the instantaneous magnitude of the slip $\lambda_1, \lambda_2$ of the front wheels.

In the circuit arrangement of FIG. 1, a circuit block 6 accommodates the actual control logic which produces braking pressure control signals or brake valve control signals pursuant to complex computing principles which embody the control philosophy that is essential for a control system. Of course, a control logic of this type, exactly as the other circuit blocks and circuit components of the circuit arrangement of FIG. 1, may also be realized by a corresponding program structure of a microprocessor or microcontroller.

The control logic 6 typically includes several function blocks or program parts. In the present case, there is, among others, a so-called yawing torque limitation unit GMB which decelerates the braking pressure rise on the higher coefficient side in the presence of different coefficients right/left.

Valve actuation units 9,10 are connected to outputs A1,A2 of the control logic 6 by way of commutators 7,8 in the circuit arrangement of FIG. 1. The valve actuation units 9,10 include final stages having output signals which finally actuate hydraulic valves 11,12 in the hydraulic brake circuits of an anti-lock brake system (ABS). In the embodiment of FIG. 1, the components and signal lines which lead to the wheel brakes of the front wheels 7,9,11 and the wheel brakes of the rear wheels 8,10,12 are shown separately because the special control (MFO) of the present invention depends in first place on the rotational behavior of the front wheels.

Another output A3 of the control logic 6 leads to the identification logic 5. Above all, circuit 5 is used for the AND-linking of the signals introduced through inputs $E_1$ to $E_6$. When the stipulated conditions are satisfied, the special control MFO (Mu-Flecken-Option-Mu-patch option) is initiated or prepared by a circuit 13. However, circuit 13 cannot cause actuation of the hydraulic valves 11 in the front-wheel brake circuits and, if necessary, also the hydraulic valves 12 in the rear-wheel brake circuits until switches 7,8 are changed over.

The braking pressure in the front-wheel brakes is determined and assessed by way of an integrator 14 having its output connected to a threshold value switch 15. The difference of the braking pressures introduced into the front-wheel brakes or the difference of the braking pressure reduction times on the front wheels (this is a measured quantity which is especially appropriate for assessment) is of interest for the initialization of the special control MFO. Therefore, the actuation times of the braking pressure reducing valves, associated with the two front-wheel brakes, on each individual wheel are sensed to determine the control quantity. The threshold value switch 15 signals that a predetermined braking pressure limit value $p_0$ is exceeded. The sign of the output signal of the threshold value generator permits identifying which of the two front wheels has the higher or lower braking pressure. It can be taken from this fact which front wheel has the higher or the lower coefficient of friction.

When the predetermined braking pressure difference limit value $p_0$ is exceeded, the output signal of the threshold value switch 15 causes change-over of the switches 7,8 so that the special control MFO (provided the other conditions are also satisfied) can now be initiated by way of circuit 13. As will be explained hereinbelow, the special control MFO effects the discharge of braking pressure from the wheel brake of the front HM-wheel and also from the rear-wheel brakes.

In FIG. 1, the braking pressure reduction signals initiated by the special control (MFO) 13 are counted as soon as a switch 16 is closed, or sensed by an integrator 17. The result is transmitted to the identification logic 5 by way of input $E_6$ because, among other criteria, the duration of pressure reduction on the LM-wheel is a criterion for the identification of a critical driving situation and the design of the special control.

For better understanding the present invention, FIG. 1 is shown in a simplified fashion. Only the components, logic blocks, switches, etc., which are necessary for understanding the special control are represented. Further, it should be noted that the described circuits, signal lines, etc., even if not expressly indicated, sense the condition control quantities on each individual wheel.

Figure 2:
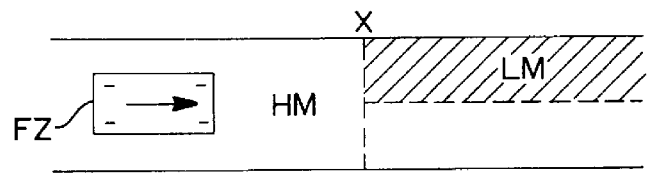
FIG. 2 is a diagram showing the braking pressure variation on the two front wheels in the represented driving situation (abrupt change in $\mu$-conditions) according to an embodiment of the present invention.
Figure 2:
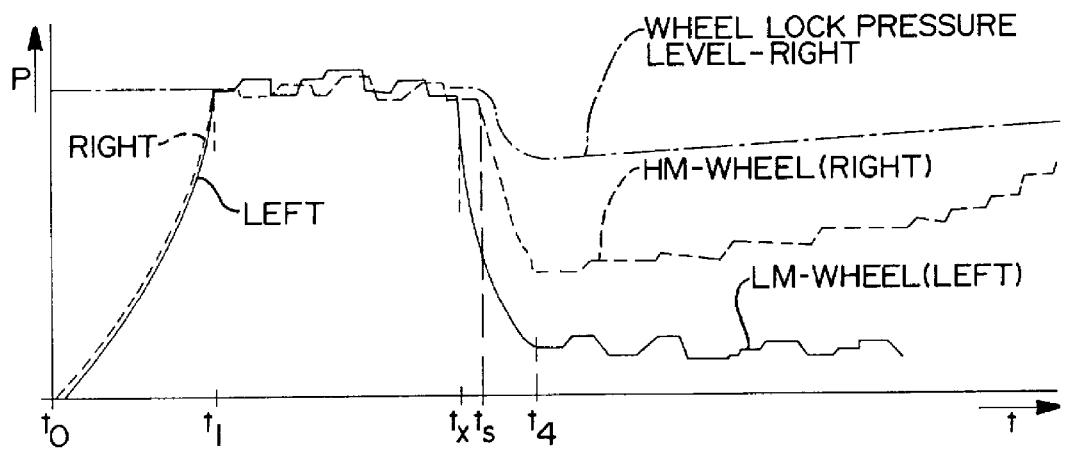
Figure 3:
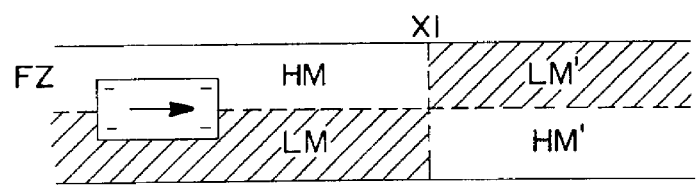
FIG. 3 shows, in the same illustration as FIG. 2, the braking pressure variation on the two front wheels in another driving situation which is also represented ($\mu$-patch road surfaces).
Figure 3:
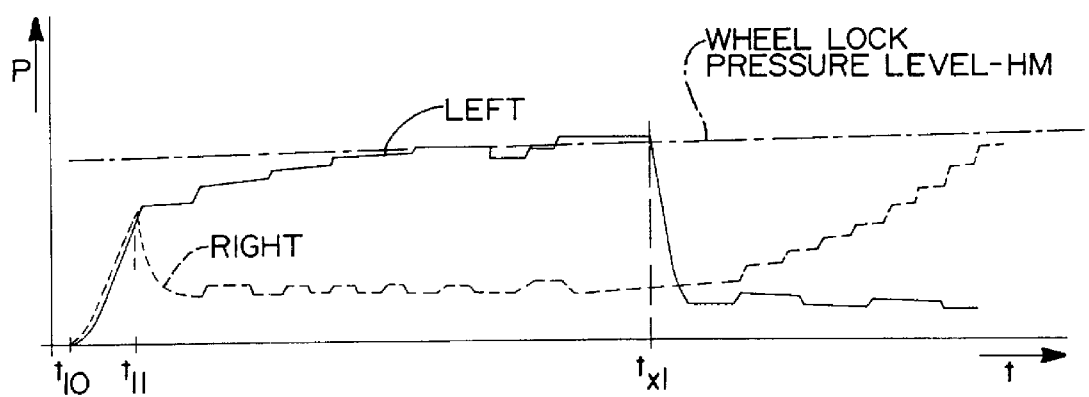

The diagrams in FIGS. 2 and 3 illustrate more clearly the circuit arrangement of the present invention of FIG. 1 which is realized by hard-wired circuits or by a program structure. On top of the diagrams, it is represented that FIG. 2 refers to a driving siutation where a vehicle FZ at point X passes from a road surface with a high coefficient of friction to a $\mu$-split surface. FIG. 3, however, relates to a so-called $\mu$-patch surface where, as soon as the vehicle passes point X1, the coefficient conditions HM/LM from right to left vary greatly or are reversed.

FIGS. 2 and 3 show the pressure variation on the right and left front wheel of the vehicle FZ during a braking operation. It can be seen in FIG. 2 that, at time $t_1$, approximately the braking pressure in the two front wheels of the vehicle FZ, which is on a road surface with a high, homogeneous coefficient of friction, i.e. a HM-road surface, reaches a wheel lock pressure level. During such a controlled braking operation, the vehicle reaches a $\mu$-split surface and, thus, a particularly critical driving situation, at time $t_x$. At time $t_x$, rapid pressure reduction caused by anti-lock control starts at the left front wheel which is now on a low coefficient surface and, hence, is the LM-wheel. The controller identifies at time $t_s$ that there is a particularly critical driving situation. The following criteria are satisfied at this point of time:

The difference of braking pressure reduction times on both front wheels of the vehicle FZ surpasses a limit value.

The vehicle (reference) speed $v_{Ref}$ is high and above a predetermined limit value.

The slip of the LM-wheel surpasses a slip limit value.

The duration of instability of the LM-wheel exceeds a certain, predetermined time.

The HM-wheel, i.e. the right wheel in FIG. 2, is in the control mode.

No special control has occurred during this control operation (which commenced at time $t_1$).

The special control MFO now initializes that, commencing time $t_s$, the pressure on the right (HM) wheel is reduced for a predetermined time of 40 msec, for example, (see FIG. 4) which depends on the instantaneous vehicle (reference) speed. Upon expiry of this period, a new, decelerated braking pressure increase starts on the HM-wheel so that the braking pressure on the HM-wheel, with a predetermined gradient, reapproaches the locking pressure level of this wheel, shown in dash-dotted lines in FIG. 2. In addition (what is not shown in FIG. 2 for the sake of clarity), pressure reduction on the rear axle can be effected simultaneously with the pressure reduction on the HM-wheel in order to still further enhance the lateral guidance and, thus, the stability of the vehicle. Because the braking pressure in the rear-wheel brakes is generally controlled according to the "select-low" principle, the braking pressure on both rear wheels is simultaneously reduced.

It must be ensured in a special control of the type of the present invention, which is based on the braking pressure reduction on the HM-wheel, that a clear-cut distinction is made between a defined, especially critical driving situation and similar events that are due to special pavements, cobblestone pavement, rough roads, etc. In the described embodiment of the present invention, initialization of the special control is therefore prevented when a very high re-acceleration of the LM-wheel of, for example, 8 g ("g"= 9.81 m/s$^2$) is detected during a braking maneuver. When re-acceleration occurs during a special control operation which is above a second, still higher limit value of e.g. 20 g, the special control will be discontinued at once. The above criteria are only a few of possible criteria for distinguishing between an actually critical and a seemingly critical driving situation.

FIG. 3 shows the braking pressure variation on the front wheels on a $\mu$-patch surface. Braking commences at time $t_{10}$, and the control on the right front wheel which is the LM-wheel at this time commences at time $t_{11}$. For yawing torque limitation, further braking pressure rise on the HM-wheel is prevented or decelerated by GMB at time $t_{11}$. At time $t_{x1}$, the wheel which so far moved on the HM side passes to a low coefficient surface (LM'). The coefficient of friction changes from LM to HM' on the other road side. Because the difference of braking pressure reduction times on both front wheels surpassed the predetermined limit value already at time $t_{x1}$, and all other criteria are satisfied in addition, special control MFO commences. The braking pressure on the (previous) HM-wheel is reduced rapidly by actuation of the braking pressure reducing valves for a predetermined duration, which depends on the vehicle (reference) speed. The braking pressure is increased with a predetermined gradient or approached to the wheel lock pressure level on the wheel brake of the right front wheel which moved from the low coefficient of friction (LM) to the high coefficient road surface (HM').

In all other respects, the same criteria and measures of influencing pressure as in the situation of FIG. 2 apply to the situation of FIG. 3.

Figure 4:
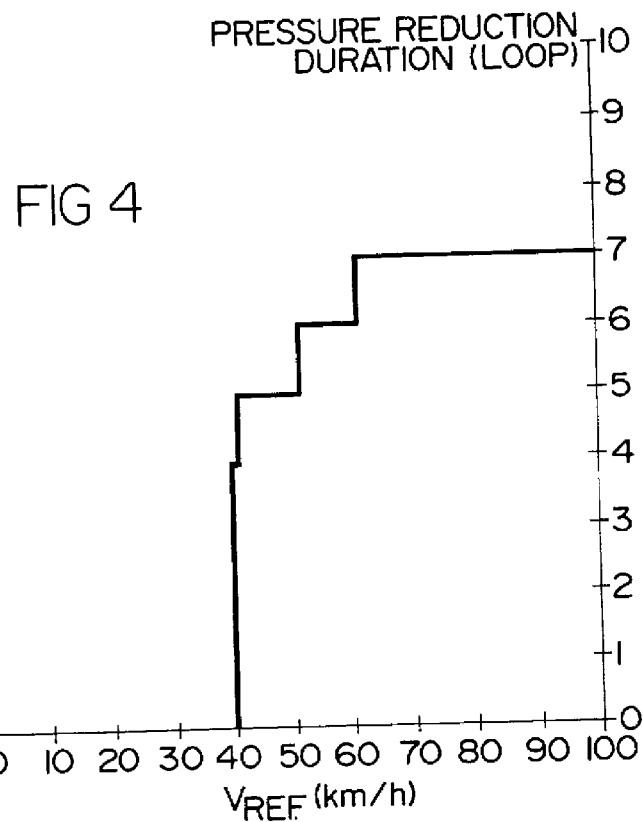
FIG. 4 is a diagram showing the dependence of the pressure reduction time on the vehicle (reference) speed.

FIG. 4 shows an example for the dependence of the predetermined duration of pressure reduction on the vehicle reference speed. Pressure reduction by the special control (MFO) will not occur below 40 km/h. Initially, i.e. when the 40 km/h limit is exceeded, the duration of pressure reduction covers five loops and is extended to a maximum value of seven loops. The duration of a loop ranges between 5 to 10 msec, for example.

Figure 5:
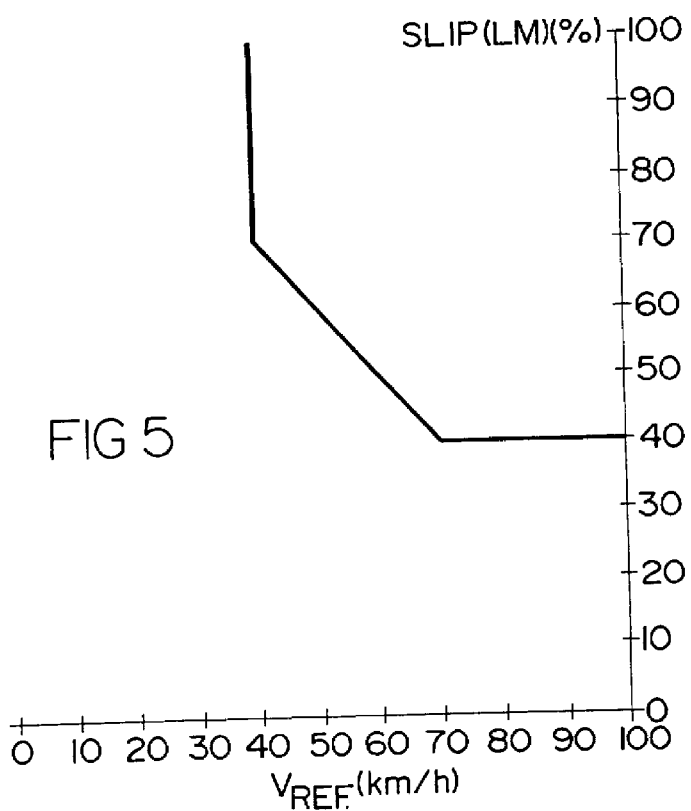
FIG. 5 is a diagram showing the variation of the predetermined slip limit value as a function of the vehicle (reference) speed.

FIG. 5 shows the dependence of the slip threshold on the vehicle reference speed. A criterion for the existence of a particularly critical driving situation and for the initialization of the special control is satisfied when the slip of the LM-wheel is in excess of the speed-responsive limit value. For example, the slip in FIG. 5 must exceed 40% in the vehicle speed range between 70 and 100 km/h.

FIG. 6 shows the linking of various criteria in a flow chart. A subroutine for the start of the special control (MFO) according to the present invention may be developed on the basis of such a type of linking the individual functions when the invention is realized by programmed circuits, such as microcomputers, microcontrollers, etc.

The subroutine is started in a step 20. A number of branching points 21,22 . . . 2n will follow in the program run where the program flow is continued only if a defined condition or a defined criterion is satisfied ("yes"). If the criterion is not satisfied ("no"), the program run is returned to start. For example, the decision in branch 21 depends on the fact whether the difference in braking pressure reduction ($\Delta$p-reduction) has surpassed a predetermined limit value $p_0$. Branch 22 interrogates whether the slip of the LM-wheel ($\lambda_{LM}$) has exceeded the slip limit value ($\lambda_0$). If "no", the loop is returned to the starting point in both cases, if "yes", the next step will follow. Finally, special control (FMO) will be triggered in a step 30 when all interrogated criteria are satisfied.

We claim:

1. A brake system circuit for enhancing the controllability of a vehicle under critical braking situations by limiting a yaw torque experienced by the vehicle, comprising:

a first braking circuit for applying a braking force associated with a right front wheel of said vehicle and a second braking circuit for applying a braking force associated with a left front wheel of said vehicle, means for detecting the coefficient of slip associated with the right and left front wheels, means for determining which of said coefficients of slip is the greater in magnitude and which of said coefficients of slip is the lesser in magnitude, means for detecting the presence or the absence of a critical driving situation, means for initiating special control of said first and second brake circuits such that in response to an affirmative detection, by said detecting means, of the presence of a critical driving situation, the brake force applied to the left wheel is reduced for a period of time, which varies as a function of vehicle speed, if the coefficient of slip of the left wheel is greater than the coefficient of slip of the right wheel, and, such that, the brake force applied to the right wheel is reduced for a period of time, which varies as a function of vehicle speed, if the coefficient of slip of the right wheel is greater that the coefficient of slip of the left wheel.

2. A circuit arrangement as claimed in claim 1, wherein the special control effects a pressure reduction in a wheel brake of a rear wheel of said vehicle.

3. A circuit arrangement as claimed in claim 1, wherein the driving situation is identified as critical if one or a plurality of the following criteria simultaneously are satisfied:

a quantity related to a difference of the braking forces between the front right and left wheels exceeds a predetermined braking force difference limit value;

the vehicle speed ranges above a predetermined speed limit value;

the lesser coefficient of slip exceeds a slip limit value which is responsive to the vehicle speed;

the duration of the instability of the front wheel, having the lesser coefficient of slip, exceeds a predetermined time;

if the front wheel associated with the greater coefficient of slip is not in a control mode, the vehicle deceleration is above a predetermined deceleration limit value, and special control has not yet taken place during the instantaneous current control action.

4. A circuit arrangement as claimed in claim 3, wherein the current driving situation is assessed as critical only if all criteria listed in claim 3 are satisfied.

5. A circuit arrangement as claimed in claim 3, wherein the slip limit value is set to a value between 60 and 70% at a vehicle speed of 40 km/h approximately and is reduced steadily at higher speeds until a slip limit value of about 40%.

6. A circuit arrangement as claimed in claim 1, wherein the special control during a braking maneuver is repeated when a critical driving situation is identified at a later time, if at least one of the two following conditions are fulfilled:

in the past, the quantity related to the difference of the braking forces between right and left front wheels has exceeded the predetermined limit value and the magnitude of said quantity as now negated;

a change in the coefficient of friction conditions between right and left side occurred.

7. A circuit arrangement as claimed in claim 1, having the lesser coefficient of friction wherein the special control is not carried out when re-acceleration of the front wheel having the lesser coefficient of slip, which is above a predetermined first acceleration limit value, is identified during a braking maneuver.

8. A circuit arrangement as claimed in claim 7, wherein the predetermined first re-acceleration limit value is set to a value in the range of 5 to 10 g with "g" being the constant of acceleration due to gravity.

9. A circuit arrangement as claimed in claim 1, wherein the special control is interrupted when one or a plurality of the predetermined criteria for the identification of a critical driving situation are not satisfied any more.

10. A circuit arrangement as claimed in claim 1, wherein the special control is terminated when re-acceleration of the LM-wheel occurs during the special control which is in excess of a predetermined, relatively high second re-acceleration limit value that is in the order of 10 to 30 g.

11. A circuit arrangement as claimed in claim 1, wherein the duration of braking force reduction caused by the special control at a vehicle speed ranging from 30 to 50 km/h is predetermined to a value between 20 and 40 msec and is increased steadily up to values ranging from 50 to 70 msec at higher speeds.

* * * * *